2,942,027
DIMETHYL FORMAMIDE PURIFICATION

James V. Hewett and Glenn W. Stahl, Camden, S.C., assignors to E. I. du Pont de Nemours and Company, Wilmington, Del., a corporation of Delaware No Drawing. Filed Dec. 7, 1955, Ser. No. 551,521

5 Claims. (Cl. 260—561)

This application is a continuation-in-part of applicants' prior copending application Ser. No. 279,792, filed April 1, 1952, now abandoned.

This invention relates to manufacture of synthetic filaments from acrylonitrile polymers, particularly by use of N,N-dimethylformamide (DMF) of improved color and purity as solvent for such polymer. The invention is concerned especially with processing of impure DMF for repeated use as solvent in extrusion of filaments of acrylonitrile polymer materially improved in whiteness and color stability over similar products of solutions containing ordinary purchased or recovered DMF.

Commercial DMF is a good solvent for acrylonitrile polymers, and solutions thereof may be extruded or "dry-spun" into filaments of generally high quality. Freedom from non-white color is especially desirable for textile yarn, but the usual dry-spun product is straw colored; this off-color appearance stubbornly resists improvement by bleaching or like treatment. Also, to make the entire process economically feasible, it is necessary to recover the solvent and reuse it, but the color of the solvent normally worsens with use. Furthermore, the gel-time of solutions prepared from recovered solvent almost invariably is inferior to that of like polymer dissolved in fresh solvent, and excessive tendency to gel-formation is a hindrance to spinning continuity.

In practice, most of the solvent is recovered from the spinning cells by condensation from the aspiration gases, and as much more as possible is recovered from the resultant tow or yarn. As recovered DMF has been subjected to relatively high temperatures in the course of solution and spinning, it is contaminated with impurities; the introduction of water necessitates concentration of the recovered DMF by distillation, during which further impurities often are formed by hydrolysis or other decomposition.

A primary object of this invention is provision of DMF substantially free of color and color-forming bodies and of improved clarity conducive to formation of polymer solutions and resulting yarns of improved color and quality. A further object of the invention is preparation of highly stable DMF solutions of acrylonitrile polymer characterized by gel-times on the order of several days and consequent improved continuity of dry-spinning. Another object of the invention is purification of DMF solvent for acrylonitrile polymers. Other objects of this invention, together with means and methods for attaining the various objects, will be apparent from the following description.

In general, the objects of this invention are accomplished by contacting DMF of substantial impurity and color in substantially anhydrous condition with both a strong-acid cation-exchange resin and a weak-base anion-exchange resin, whereby substantially all color bodies and color-forming impurities are removed from the DMF. In particular, this invention comprehends such treatment of DMF containing as contaminants at least about 0.02% of formic acid, dimethylamine, or salts of either or both of them and having a Hazen color number of at least 10 to reduce the contaminant concentration to at most 0.002% and the color number to at most 5. The invention contemplates repeated use of DMF so treated as solvent in the dry-spinning of acrylonitrile polymers.

The insoluble polysulfonic acid resins are suitably acidic cation-exchange resins, e.g., sulfonated phenol/formaldehyde resins, and sulfonated polystyrene/divinylbenzene resins; especially useful are those having an apparent acidity in the range of pH 3 to 5, which are capable of removing very weak cations from liquid media. Such cation-exchange resins are described in U.S. Patents 2,-204,539 and 2,366,007. Useful as anion-exchange resins are insoluble weakly basic resins of the non-quaternary polyamine type, such as are described in U.S. Patents 2,198,874 and 2,591,574 and British Patent 472,404. The apparent basicity of these useful anion-exchange resins is in the range of pH 8 to 11; the useful resins will remove formic acid from water solutions, but are too weak to remove halogens from aqueous ammonium halide solutions, for example.

The ion-exchange resins may be used in separate layers or beds or mixed together. If the two types are used separately, it is preferable, as illustrated hereinafter, that the cation-exchange resin be contacted first, the effluent DMF from the bed of the cation-exchange resin then to be passed through a bed of the anion-exchange resin. Excellent results are obtained by either the two-step method just defined or by the use of a mixed bed containing suitable amounts and distribution of both the cation- and anion-exchange resins.

It is, indeed, surprising that such an excellent solvent as DMF could be passed through a bed of ion-exchange resin without dissolving it somewhat and thereby becoming much more highly colored. In fact, when this idea was first tried, color-throw occurred from the separate resins, and many technical observers thought the proposed process never could be made useful. The color-throw from both cation- and anion-exchange resins of the types prescribed above persisted through several cycles of de-ionization of the DMF and aqueous regeneration of the resin, but eventually the ion-exchange resins became stable and not only stopped bleeding but actually took up color and color-forming matter from the impure DMF.

Recovery of DMF as an aqueous solution and concentration by distillation promotes the formation of hydrolysis by-products and probably also fails to exclude some color-forming bodies, so the distillation step should precede the prescribed step of ion-removal. Electrical conductivity of recovered DMF containing no more than about 0.25% water (i.e., concentrated to substantially anhydrous condition) is many times less than that of the same DMF diluted to a 20% aqueous solution, and in the inception of the present process effective ion-removal from such liquid appeared very questionable, especially in view of indications by the resin-manufacturers that the resins must be kept water-wet. The resins hang onto water tenaciously, and to use them with an organic liquid soluble to a very considerable extent in water and in which water is also readily soluble almost appeared out of the question, as it seemed likely that the substantially anhydrous DMF would pick up any water in the resin and render the resin useless. Also doubtful was the prospect of regeneration of the exchange resins for repeated use because success of the requisite efficient displacement of organic liquid with water and successive displacement of water with organic liquid could not be predicted.

In the following examples, which further illustrate and explain the practice of this invention, parts and percentages are given by weight unless otherwise indicated. Results of electrophotometric determination of color (using light of 4250 A.) are given as Hazen color number, which is the same as the widely used scale of the American Public Health Association; on this scale distilled water is zero, and standard samples of stable inorganic salt solutions provide recognized calibration points. Formic acid (including formate ion) was determined by titration for acidity, methylene blue indicator, polarigraphically, and by aldehyde determination after application of a reducing agent; dimethylamine (and dimethylammonium ion) by titration for basicity, odor, and other conventional analytical methods; and dimethylammonium-N,N-dimethyl carbamate and a mixed salt of it with dimethylammonium formate by crystallization and by determination of its decomposition products in conventional manner. (Concentration below 0.0005% is reported as nil.) Gel-time is the time within which the viscosity of a spinning solution of the polymer increases tenfold, as determined by the falling-ball method.

EXAMPLE I

An ion-exchange bed containing 200 milliliters of an insoluble cation-exchange resin of the polysulfonic acid type, a sulfonated styrene/divinylbenzene polymer marketed by Rohm and Haas Company as "Amberlite IR-120," is prepared to a depth of about 7 inches in a 1½ inch (inside diameter) glass tube. The bed is prepared for use, i.e., "color-conditioned" or "preconditioned," by passing DMF down through the bed to exhaustion of the ion-exchange resin, which then is regenerated by water flow; after 3 subsequent repetitions of this cycle, the bed is ready. (The DMF used to precondition the resin can be that recovered from aqueous solution by distillation.)

A sample of reclaimed DMF having been used as solvent in the dry-spinning of an acrylonitrile polymer (according to the procedure of U.S. Patent 2,404,714) is selected and found to contain 0.25% water and 0.037% formic acid after distillation. The sample is highly colored, being distinctly yellow, with a Hazen number of 36; it is somewhat acidic (pH of about 6.5) with an electrical conductivity of 38.5 micromhos in 4% aqueous solution, and a standard acrylonitrile polymer solution thereof has a gel-time of 22 hours.

This sample is passed down through the prepared cation-exchange bed at the rate of 6.7 cubic centimeters per minute (1/30 of the bed volume per minute). A comparison of the first two columns of figures in Table IA shows the appreciable improvement obtained in both color and gel-time of this intermediate product.

The bulk of the DMF sample so treated next is passed in like manner through a bed of like size but consisting of an insoluble weak-base anion-exchange resin of the non-quaternary polyamine type described in Patent 2,591,574 and marketed by Rohm and Haas Company as "Amberlite IR-45," which resin, had also been preconditioned to remove color throw as described above. The results of tests on a portion of this product are contained in the last column of Table IA below.

Table IA

|  | Feed | Exchange Resin | |
|---|---|---|---|
|  |  | Cation Only | Cation Then Anion |
| Conductivity of 4% Aqueous Solution (micromhos) | 38.5 | 49.4 | 3.16 |
| Color (Hazen no.) | 36 | 23.5 | 5 |
| Acidity (as percent formic acid) | 0.037 | 0.043 | Nil |
| Basicity (as percent dimethylamine) | Nil | Nil | 0.0005 |
| Percent water | 0.24 | 0.30 | 0.79 |
| Gel-Time (hours) | 22 | 32 | 49 |

Treatment of a like sample of recovered DMF with the same anion-exchange resin alone and then with the same cation-exchange resin, i.e., in the opposite order to that described above, gives comparable results, as shown in Table IB below.

Table IB

|  | Feed | Exchange Resin | |
|---|---|---|---|
|  |  | Anion Only | Anion Then Cation |
| Conductivity of 4% Aqueous Solution (micromhos) | 38.5 | 25.1 | 9.63 |
| Color (Hazen no.) | 36 | 23.5 | 5 |
| Acidity (as percent formic acid) | 0.037 | Nil | 0.003 |
| Basicity (as percent dimethylamine) | Nil | 0.02 | Nil |
| Percent water | 0.24 | 0.32 | 0.73 |
| Gel-Time (hours) | 22 | 23 | 51.5 |

The data in the above tables show that the two-resin treatment markedly improved the color and associated gel-time of both samples, indicating also their freedom from ionized material in low conductivity of the end-product. The somewhat higher conductivity of the second sample apparently was due to the small amount of formic acid resulting from the presence of salts unaffected by the anion-exchange resin but converted to the acid by the cation-exchange resin. Therefore, the first order of treatment is preferred for DMF recovered from use as spinning solvent when separate beds of the different resins are used. Alternatively, a single bed containing both resins may be used with like satisfactory results. The final water content of the above samples was slightly higher than desired, but this was attributed to inadequate water replacement following the regeneration of the beds. (In subsequent tests it was shown that the water content of the product could consistently be maintained below 0.25%.)

EXAMPLE II

A sample of DMF purchased from a usual commercial source is found to have a basic pH (about 8); it is not so colored as the recovered DMF employed as a starting material in the above example but is more colored than the deionized product. Suspected basic impurities in this solvent include, in addition to dimethylamine (and dimethylammonium ion), methylamine (and methylammonium ion), methylammonium-N-methylcarbamate, dimethylammonium-N-methylcarbamate, and methylammonium-N,N-dimethylcarbamate. It is passed through a small bed composed of alternate layers of the resins of Example I at the same flow rate and otherwise under like conditions. The results of this treatment are recorded below in Table II.

Table II

|  | Before | After |
|---|---|---|
| Conductivity of 4% Aqueous Solution (micromhos) | 30 | 5 |
| Color (Hazen no.) | 12 | 4 |
| Acidity (as percent formic acid) | Nil | Nil |
| Basicity (as percent dimethylamine) | 0.025 | Nil |
| Percent water | 0.20 | 0.20 |
| Gel-Time (hours) | 40 | 50 |

The above table shows that the color and gel-time of commercial DMF, though better than those of ordinary reclaimed DMF, are improved similarly by treatment according to this invention.

EXAMPLE III

A sample of DMF is recovered from a conventional dry-spinning operation by washing and distillation; when it is used as solvent for a standard fiber-forming acrylonitrile polymer, the resulting solution exhibits a gel-time of only 15 hours, an unsatisfactorily short period. Accordingly, the impure DMF is passed through a bed of the size described in Example I, composed of anion-exchange resin of the non-quaternary polyamine type marketed by the Permutit Company as "Permutit CCG" (previously conditioned by passing DMF therethrough as described above). The purified DMF provides a like standard acrylonitrile polymer solution with a gel-time of about 50 hours at the same solvent concentration, a very useful increase.

As indicated earlier, an anion-exchange resin for use according to this invention should be of the non-quaternary type because the stronger basic resins of the quaternary polyamine type, e.g., those known in the trade as "Permutit S" and "Dowex 2" and even such an intermediately basic resin as "Permutit Ionac 300-A," hydrolyze the DMF with the formation of formic acid and dimethylamine.

The exchange resins operate in an essentially organic medium, the water content of the DMF feed being below 0.25%. Nevertheless, regeneration of the beds must be done with aqueous solutions and this poses the problem of displacing and recovering, in relatively concentrated form, the DMF contained in the beds. Also, removing the water before regular ionic exchange can be resumed becomes important. Inasmuch as DMF is a relatively expensive material that for use as a solvent must be substantially free of water, preferably below about 0.25% by weight, it is essential to minimize mixing of water with the DMF. Accordingly, the specific methods of regenerating and handling DMF coming from the ion-exchange beds during the replacement of the DMF with water prior to passing the regenerating solutions therethrough and the replacement of the water with DMF following regeneration are noteworthy. These steps in treatment of recovered DMF on a larger scale are described in the following example.

EXAMPLE IV

Deionization of recovered DMF, of the general composition and characteristics shown in Example I and from which a sublimable mixed salt identifiable as dimethylammonium-N,N - dimethylcarbamate/dimethylammonium formate can be isolated, is carried out by passing it first through a bed of conditioned "Amberlite IR-120" as the cation-exchange resin, with the partially purified DMF then passing through a similar bed of "Amberlite IR-45" as the anion-exchange resin. Each of the bed volumes is 60 cubic feet and the rate of DMF flow through each of the beds is about 50 gallons per minute, corresponding to a minimum of about 25,000 gallons per working shift. Regeneration of the anion-exchange bed is practiced daily, while regeneration of the cation-exchange bed is performed only every other day.

The purified DMF so produced, tested over a period of time, shows conductivity figures of less than 5 micromhos when measured as 4% aqueous solution. The gel-time of a standard polyacrylonitrile solution in this DMF undergoes a more than 2-fold increase (to more than 50 hours) over that of similar solutions made with DMF recovered by distillation but not otherwise purified. The DMF color is substantially improved, generally being below 5 in Hazen number and many times at 2 or less in Hazen number. Furthermore, there remains no trace of the undesirable fishy odor frequently noticed in DMF previously recovered by distillation without further purification. The amount of acidity as formic acid is seldom over 0.002% and generally is so much lower as to be undetectable, while the amount of base as dimethylamine is generally below 0.002%; these concentrationsa re so low that no carbamate can be identified in this product. The amount of water in the product is maintained consistently between 0.20% and 0.25% and can be made less if desired.

Acrylonitrile polymer filaments and yarns made from solutions with this decolorized and purified DMF were decidedly whiter than like products of solutions made with untreated solvent, and this attests to the removal of color-forming bodies, as well as colored material, from the solvent. Furthermore, these whiter yarns were much less susceptible to darkening with heating or aging.

The total loss of DMF in waste liquors from each regeneration of both beds amounted to only about 100 pounds. This is, indeed, very little, considering the size of the beds and the necessity for completely displacing all the DMF with water and then all the water with DMF. Even if the loss were several times this value, the process would be well worth it in view of the excellent quality of the DMF produced. In practice the complete cycle of regeneration was carried out as follows.

After the DMF feed was stopped, both beds were allowed to drain flush with the top surface of the bed (easily controlled by drains in the form of inverted U pipes leading from the bottom of the confining tanks and peaking at the level of the top surface of the bed). By this procedure entrappage of air in the beds was avoided. Previously recovered weak DMF solution (about 3% DMF and 97% water) was then pumped into the bed tanks which are soaked with the substantially anhydrous DMF, arranged in parallel (through distributor pipes located immediately above the beds), and the first effluent was collected for dewatering in a still for handling concentrated aqueous DMF previously obtained during the deionizing treatment. This fraction was collected until the DMF concentration of the effluent had dropped from about 99% to 75%. The average concentration of DMF in this fraction was above 94%. Collection of a second fraction of effluent was then started and continued until the DMF concentration had fallen to about the average concentration of the DMF for this fraction, about 30%. This fraction was processed through a still for handling weaker DMF solution. By this time the weak DMF wash liquor, previously collected, was largely exhausted and its flow to the ion-exchange beds was stopped.

Demineralized water was then put on the line and fed to the top of the two beds through the same distributors, and the effluent was sent to a tank for weak DMF wash liquor. This flow was continued until the DMF concentration was reduced to about 0.6% and then the beds were completely drained (by changing the valve settings and by-passing the inverted U pipes). Even though the displacement washing was stopped while the effluent liquor contained as much as 0.6% DMF, draining the beds dry left extremely little DMF to be subshequently washed to waste.

Furthermore, this is the one point in the process where the beds can be completely drained without danger of entrapping air, for the ensuing step was a back-washing procedure in which demineralized water was admitted at the bottom of the bed to flow upwardly, displacing the air before it. In this step a very strong flow of water was used and for practical reasons the beds were back-washed one at a time. The back-wash was discharged (through the upper distributor pipes) to waste. After back-washing of both beds and draining of the excess water through the inverted U pipes, actual regeneration was carried out in the usual manner, as follows.

A 5% sulfuric acid solution was admitted to the cation-exchange bed, through the lower distributor, and it then was discharged through the inverted U pipe to waste. Similarly the anion-exchange bed was regenerated with 5% sodium hydroxide solution. Thereafter, the two beds were rinsed by passing large volumes of water down through each of the beds, the discharge of waste exiting through the inverted U pipes until the effluents were neutral to litmus.

The replacement of the water contained in the beds with DMF without producing an excessive amount of aqueous DMF was next accomplished as follows. With the two beds connected in parallel to the DMF feed line, DMF was admitted simultaneously to the two beds and the effluent, chiefly water, was sent to waste until about 260 gallons of DMF had been added to each bed. Then the anion-exchange bed was cut off the line while the flow was continued through the cation-exchange bed until a total of 290 gallons of DMF had been added to that bed, at which time the effluent was directed to collection for handling in the weak still-column. At this point the concentration of DMF in the effluent was about 1%. While the first run from the cation-exchange bed to the weak still-column feed tank was very dilute, by the time an additional 180 gallons of DMF had been added to the bed the effluent was about 70% DMF and the average concentration of this fraction sent to the weak still-column was about 35% DMF. The DMF flow to the cation-exchange bed was continued while the effluent was now directed to a feed tank for the concentrated still-column. An additional 650 gallons of DMF was added to the bed and by the end of this addition the water concentration had dropped to about 0.7% (99.3% DMF).

Next, the anion-exchange bed was connected in series so that the effluent from the cation-exchange bed flowed down through the anion-exchange bed. The first 140 gallons of effluent, averaging about 30% DMF, was delivered to a feed tank for the weak still-column. Thereafter the effluent was directed to the concentrated still-column feed tank. After passage of an additional 900 gallons of DMF feed into the bed, the water content of the effluent had dropped to about 0.25% and collection of effluent from the beds as deionized product was resumed to begin the treating cycle.

The claimed invention:

1. Process comprising the steps of color-conditioning a strong-acid cation-exchange resin and a weak-base anion-exchange resin by contacting the resins with N,N-dimethylformamide to exhaustion of the ion-exchange resin, regenerating the resins by water flow, and repeating this cycle until the ion-exchange resins no longer impart color to the N,N-dimethylformamide, bringing a composition consisting essentially of N,N-dimethylformamide in substantially anhydrous form and containing as impurities at least about 0.02% by weight of at least one substance from the group consisting of formic acid, dimethylamine, and salts of these two compounds into contact with the color-conditioned strong-acid cation-exchange resin and into contact with the color-conditioned weak-base anion-exchange resin and maintaining the indicated contact until the concentration of impurities is reduced at least to about 0.002% by weight.

2. The process of claim 1 in which the impure untreated composition has a color represented by a Hazen number of at least 10 and the color of the treated product is represented by a Hazen number of at most 5.

3. The process of claim 1 in which the impure untreated composition is recovered solvent from dry-spinning of acrylonitrile polymer.

4. The process improvement of claim 1 in which the cation-exchange resin comprises a sulfonated styrene/divinylbenzene polymer and the anion-exchange resin comprising a non-quaternary polyamine.

5. Process comprising the steps of color-conditioning a strong-acid cation-exchange resin and a weak-base anion-exchange resin by contacting the resins with N,N-dimethylformamide to exhaustion of the ion-exchange resins, regenerating the resins, and repeating this cycle until the ion-exchange resins no longer impart color to the N,N-dimethylformamide, bringing into contact with said resins substantially anhydrous N,N-dimethylformamide recovered from the dry spinning of acrylonitrile polymer, said N,N-dimethylformamide having an off-white color and containing as impurities at least about 0.02% by weight of at least one substance from the group consisting of formic acid, dimethylamine, and salts of these two compounds, maintaining the indicated contact until the concentration of impurities is reduced at least to about 0.002% by weight, thereby eliminating the off-white color of the solvent.

References Cited in the file of this patent

UNITED STATES PATENTS

| | | |
|---|---|---|
| 2,409,441 | Metzer | Oct. 15, 1946 |
| 2,560,504 | Day et al. | July 10, 1951 |
| 2,566,353 | Mills | Sept. 4, 1951 |
| 2,611,763 | Jones | Sept. 23, 1952 |
| 2,648,709 | Sletzinger et al. | Aug. 11, 1953 |
| 2,649,481 | Caldwell | Aug. 18, 1953 |
| 2,713,041 | Friedlander et al. | July 12, 1955 |
| 2,769,792 | Ham | Nov. 6, 1956 |

FOREIGN PATENTS

| | | |
|---|---|---|
| 615,688 | Great Britain | Jan. 10, 1949 |

OTHER REFERENCES

Power, vol. 99, No. 7, pp. 73–77, July 1955.

Amber-hi-lites, Rohm and Haas Co., Ion Exchange Report, No. 4, page 2 (received in Div. 50, April 22, 1951).

Nachod Ion Exchange, Academic Press (1949), pp. 316 and 340–342.